United States Patent [19]

Hussain et al.

[11] Patent Number: 4,665,111

[45] Date of Patent: May 12, 1987

[54] CASTING COMPOUND FOR ELECTRICAL AND ELECTRONIC COMPONENTS AND MODULES

[75] Inventors: Amir Hussain; Christian Von Stein, both of Munich; Christa Pflugbeil, Hohenschaeftlarn, all of Fed. Rep. of Germany

[73] Assignee: Siemens Aktiengesellschaft, Berlin and Munich, Fed. Rep. of Germany

[21] Appl. No.: 773,878

[22] Filed: Sep. 9, 1985

[30] Foreign Application Priority Data

Oct. 12, 1984 [DE] Fed. Rep. of Germany ....... 3437548

[51] Int. Cl.[4] ............................ C08K 3/22; C08K 3/08
[52] U.S. Cl. .................................... 523/428; 523/434; 523/457
[58] Field of Search ....................... 523/434, 428, 457; 525/119

[56] References Cited

U.S. PATENT DOCUMENTS

| | | | |
|---|---|---|---|
| 3,027,357 | 3/1962 | Stickle | 525/119 |
| 3,305,601 | 2/1967 | Hicks | 525/119 |
| 3,312,754 | 4/1967 | Marks et al. | 525/119 |
| 3,655,818 | 4/1972 | McKown | 523/428 |
| 3,793,285 | 2/1974 | Koss | 523/457 |
| 3,926,904 | 12/1975 | Scola | 525/119 |
| 4,009,141 | 2/1977 | Nichols et al. | 523/457 |
| 4,465,542 | 8/1984 | Furihata | 523/428 |
| 4,482,660 | 11/1984 | Minamisawa et al. | 523/428 |
| 4,500,660 | 2/1985 | Minamisawa et al. | 523/434 |

Primary Examiner—Lewis T. Jacobs
Attorney, Agent, or Firm—Hill, Van Santen, Steadman & Simpson

[57] ABSTRACT

A filled, tough-elasticized casting compound comprised of resin, hardener, accelerator, and filler, for electrical and electronic components which excellently eliminates the heat in cast components and which can also withstands extreme temperature shocks.

6 Claims, No Drawings

CASTING COMPOUND FOR ELECTRICAL AND ELECTRONIC COMPONENTS AND MODULES

BACKGROUND OF THE INVENTION

1. Field of the Invention

The present invention relates to a resin casting or potting compound or adhesive for electrical and electronic components and modules, and in particular to a resin casting compound for thermally stressed electrical components.

2. Description of the Prior Art

Thermally stressed components are components that have high temperature peaks during operation. It is important for the useful life of such devices that as much heat as is possible be removed from the device by the resin casting or potting compound.

The cure hardening of epoxy resin compounds is an exothermic process, i.e. a chemical reaction that occurs while emitting heat. The temperature rise effected by the exothermy is correspondingly higher in relation to the poorer the heat dissipation properties of the cast specimen. The course of the cross-linking, which is normally very turbulent, is greatly moderated by the admixture of filling materials, thereby significantly reducing the exothermic temperature peak.

In the past, the thermal conductivity of the casting compound, for example an epoxy compound, has been enhanced by the addition of large quantities of aluminum oxide (Circuits Manufacturing, Feb. 1984, pages 89–96, particularly page 90). Given this larger addition of granular fillers, impact resistances that lie significantly below the values obtained by the unfilled resin system result. This reduction in the impact resistance of the resin compound results in a tendency to crack when it undergoes temperature shocks, thereby resulting in outages of cast components.

SUMMARY OF THE INVENTION

It is an object of the present invention to provide a composition for a filled, tough-elasticized resinous casting compound that excellently dissipates heat from electrical components and that can withstand extreme temperature shocks.

In accordance with the foregoing objective, the present invention provides a casting compound comprised of 50–100 parts by weight of a cycloaliphatic resin, 0–50 parts by weight of a liquid epoxy resin, 5–15 parts by weight of a copolymer, 1 part by weight of an accelerator compound, 90 parts by weight of a hardener compound, and 450–500 parts by weight of a filler mixture. The preferred cycloaliphatic resin is 3, 4-epoxy cyclohexylmethyl-cyclohexane carboxylate, the preferred epoxy resin is diglycidylether-bisphenol-A-epoxy resin and/or has an epoxide equivalent of 5.3–5.8 Ep-equivalent/kg, the preferred copolymer is butadiene and acrylonitrile with terminal carboxyl groups, the preferred accelerator compound is Tris (dimethylaminomethyl)-phenol, the preferred hardener is methylhexahydrophthalic anhydride, and the preferred filler mixture is a mixture of special fused alumina and small aluminum balls or flakes.

This casting compound is processed by combining the two resins and the copolymer, forming a resin composition. This resin composition is then heated to 80° C., evacuated, and mixed with a proportional amount of the homogeneously mixed filler mixture, forming a first component. A second component is formed by mixing the hardener compound, the accelerator compound, and the filler mixture if needed. This second component is also evacuated. As a last step, the first component and second component are blended together and evacuated.

The casting compound of the present invention has the advantages of having low coefficient of expansion $<30\ 10^{-6}/°C.$, high impact resistance due to caoutchouc modification, a dielectrical constant which is constant up to 100° C., and high thermal conductivity—$\geq 1.8$ W/mK glass transition temperature, $>100°$ C. and electrical resistivity $10^{12}$ Ohm/cm.

Furthermore, the casting compound of the present invention is very compatible with electrical or electronic components, it has excellent adhesion properties, and it is extremely resistant to cracking. Also, the tough-elastification of this compound achieved by the liquid caoutchouc functions to eliminate casting compound problems associated with individual design choices for electrical or electronic components.

Although other modifications and changes may be suggested by those skilled in the art, it is the intention of the inventors to embody within the patent warranted hereon all changes and modifications as reasonably and properly come within the scope of their contribution to the art.

We claim as our invention:

1. A resinous casting compound for electrical and electronic components and modules, particularly for thermally stressed components, comprising:
   a cycloaliphatic resin comprising 3, 4-epoxy cyclohexylmethyl-cyclohexane carboxylate;
   a liquid epoxy resin comprising diglycidyletherbisphenol-A-epoxy resin;
   a copolymer comprising butadiene and acrylonitrile with terminal carboxyl groups;
   an accelerator compound;
   a hardener compound; and
   a filler mixture selected from the group consisting of: fused alumina and small aluminum balls; and fused alumina and aluminum flakes.

2. The compound of claim 1 wherein said epoxy resin has an epoxide equivalent of 5.3–5.8 Ep-equivalent/kg.

3. The compound of claim 1 wherein said accelerator compound is Tris (dimethylaminomethyl)-phenol.

4. The compound of claim 1 wherein said hardener compound is methylhexahydrophthalic anhydride.

5. A resinous casting compound for electrical and electronic components and modules comprising:
   50–100 parts by weight of 3-4-epoxy cyclohexylmethyl-cyclohexane carboxylate;
   0–50 parts by weight of diglycidylether-bisphenol-A-epoxy resin;
   5–15 parts by weight of a copolymer comprising butadiene and acrylonitrile with terminal carboxyl groups;
   1 part by weight of an accelerator compound;
   90 parts by weight of a hardener compound; and
   450–500 parts by weight of a filler mixture selected from the group consisting of: fused alumina and small aluminum balls; and fused alumina and aluminum flakes.

6. A resinous casting compound for electrical and electronic components and modules comprising:
   a resin compound comprising 3, 4-epoxy cyclohexylmethylcyclohexane carboxylate and a liquid epoxy having an epoxide equivalent of 5.3–5.8 Epequivalent/kg;

a copolymer comprising butadiene and acrylonitrile with terminal carboxyl groups;
an accelerator compound;
a hardener compound; and
a filler mixture selected from the group consisting of: fused alumina and small aluminum balls; and fused alumina and aluminum flakes.

* * * * *